(12) United States Patent
Sohmshetty et al.

(10) Patent No.: US 11,583,999 B2
(45) Date of Patent: Feb. 21, 2023

(54) METHOD AND SYSTEM FOR OPERATING A TRANSFER ROBOT IN A MANUFACTURING ENVIRONMENT

(71) Applicant: Ford Global Technologies, LLC, Dearborn, MI (US)

(72) Inventors: Raj Sohmshetty, Canton, MI (US); Mario Anthony Santillo, Canton, MI (US); Justin Miller, Berkley, MI (US); Meghna Menon, Rochester Hills, MI (US); Matthew Cui, Troy, MI (US); Shankar Mohan, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 282 days.

(21) Appl. No.: 17/063,300

(22) Filed: Oct. 5, 2020

(65) Prior Publication Data

US 2022/0105622 A1    Apr. 7, 2022

(51) Int. Cl.
*G05B 19/418* (2006.01)
*B25J 9/00* (2006.01)
*B25J 9/16* (2006.01)
*B25J 5/00* (2006.01)
(Continued)

(52) U.S. Cl.
CPC .............. *B25J 9/0084* (2013.01); *B25J 5/00* (2013.01); *B25J 9/0096* (2013.01); *B25J 9/08* (2013.01); *B25J 9/1697* (2013.01); *B25J 11/005* (2013.01)

(58) Field of Classification Search
CPC . B25J 9/0084; B25J 5/00; B25J 9/0096; B25J 9/08; B25J 9/1697; B25J 11/005; B25J 9/162; B25J 9/0093; B25J 9/1679; B25J 9/1661; B25J 13/087; B25J 19/023; G05B 2219/40272; G05B 2219/40294;
(Continued)

(56) References Cited

U.S. PATENT DOCUMENTS 9,020,636 B2 * 4/2015 Tadayon ................. F24S 40/20
                                                              901/1
9,827,683 B1 * 11/2017 Hance ...................... B25J 9/162
2018/0311822 A1 * 11/2018 Kaminka ................. B25J 9/162

FOREIGN PATENT DOCUMENTS

DE    102013019836        7/2014
DE    102017129343    *   6/2019
DE    102018202115        8/2019
(Continued)

*Primary Examiner* — Harry Y Oh
(74) *Attorney, Agent, or Firm* — Burris Law, PLLC

(57) ABSTRACT

A system includes a robotic system including a robot disposable at a mobile workstation, where the robot is configured to perform an automated operation on a workpiece. The system includes one or more transfer robots configured to transfer the robotic system to or from the mobile workstation. The system includes a control system configured to command the transfer robot to perform a transfer operation of the robotic system, where the transfer operation includes at least one of disposing the robotic system at the mobile workstation or retrieving the robotic system from the mobile workstation. The control system is configured to control the mobile workstation and the robotic system based on image data from the one or more infrastructure sensors, position data from the one or more on-board position sensors, the automated operation to be performed by the robot, or a combination thereof.

20 Claims, 3 Drawing Sheets

(51) Int. Cl.
*B25J 9/08* (2006.01)
*B25J 11/00* (2006.01)

(58) Field of Classification Search
CPC .......... G05B 19/41845; G05B 19/4189; G05B 19/4182; Y02P 90/02
See application file for complete search history.

(56) References Cited

FOREIGN PATENT DOCUMENTS

EP 1473123 6/2018
EP 3579174 12/2019

\* cited by examiner

METHOD AND SYSTEM FOR OPERATING A TRANSFER ROBOT IN A MANUFACTURING ENVIRONMENT

FIELD

The present disclosure relates to methods and systems for operating a transfer robot in a manufacturing environment.

BACKGROUND

The statements in this section merely provide background information related to the present disclosure and may not constitute prior art.

A manufacturing environment can include a fixed workpiece and one or more robots that perform various manufacturing processes on the fixed workpiece as the workpiece traverses through an assembly line. However, certain manufacturing processes performed by the robots, such as three-dimensional (3D) printing, are not suitable when large numbers of fixed workpieces traverse through the assembly line due to the amount of time needed to complete the manufacturing process. Furthermore, certain manufacturing processes require physical access to the fixed workpiece, thereby inhibiting the efficiency of the manufacturing environment.

These issues with certain manufacturing processes in a manufacturing environment, among other issues with said manufacturing processes, are addressed by the present disclosure.

SUMMARY

This section provides a general summary of the disclosure and is not a comprehensive disclosure of its full scope or all of its features.

The present disclosure provides a system for guiding a mobile workstation within a manufacturing environment, where the mobile workstation includes a workpiece and one or more on-board position sensors, and where the manufacturing environment includes one or more infrastructure sensors. The system includes a robotic system including a robot disposable at the mobile workstation, where the robot is configured to perform an automated operation on the workpiece. The system includes one or more transfer robots configured to transfer the robotic system to or from the mobile workstation. The system includes a control system configured to command the transfer robot to perform a transfer operation of the robotic system, where the transfer operation includes at least one of disposing the robotic system at the mobile workstation or retrieving the robotic system from the mobile workstation. The control system is configured to control the mobile workstation and the robotic system based on image data from the one or more infrastructure sensors, position data from the one or more on-board position sensors, the automated operation to be performed by the robot, or a combination thereof.

In some forms, the image data corresponds to an undetectable zone of an on-board vision sensor of the robotic system.

In some forms, the mobile workstation includes a platform for supporting an operator of the robotic system.

In some forms, the robotic system includes one or more actuators to adjust a position of the robot within the mobile workstation.

In some forms, the position data corresponds to an on-board position of the robot on the mobile workstation, and the one or more actuators adjust the position of the robot within the mobile workstation based on the on-board position.

In some forms, the robotic system further comprises a fastening mechanism to secure the robot to the mobile workstation.

In some forms, the fastening mechanism is operable to attach the robot to and detach the robot from the mobile workstation using a magnetic force, a vacuum force, an adhesive force, or a combination thereof.

In some forms, the control system is configured to determine whether the automated operation is completed by the robotic system and command the transport to retrieve the robotic system from the mobile workstation in response to the automated operation being completed by the robot system.

In some forms, the control system is configured to determine whether the position of the robot within the manufacturing environment corresponds to a predefined position within the manufacturing environment and command the transfer robot to retrieve the robotic system from the mobile workstation in response to the position of the robot within the manufacturing environment corresponding to the predefined position.

In some forms, the system further includes a plurality of the transfer robot, where the control system is configured to select a transfer robot from the plurality of the transfer robots to transfer the robotic system.

The present disclosure provides a method for guiding a mobile workstation within a manufacturing environment, where the mobile workstation includes a workpiece and one or more on-board position sensors, and where the manufacturing environment includes one or more infrastructure sensors. The method includes moving, using the mobile workstation, the workpiece through the manufacturing environment. The method includes performing, using a robotic system including a robot disposed in the mobile workstation, an automated operation on the workpiece. The method includes commanding, using a control system, a transfer robot to transfer the robotic system to or from the mobile workstation. The method includes controlling, using the control system, the mobile workstation and the robotic system based on image data from the one or more infrastructure sensors, position data from the one or more on-board position sensors, the automated operation to be performed by the robot, or a combination thereof.

In some forms, the image data corresponds to an undetectable zone of an on-board vision sensor of the robotic system.

In some forms, the method includes providing a platform on the mobile workstation for an operator.

In some forms, the position data corresponds to an on-board position of the robot on the mobile workstation, and the method further includes adjusting the position of the robot based on the on-board position.

In some forms, the method further includes securing the robot to the mobile workstation via a fastening mechanism of the robotic system prior to performing the automated operation.

In some forms, the fastening mechanism employs a magnetic force, a vacuum force, an adhesive force, or a combination thereof.

In some forms, the method further includes determining, using the control system, whether the automated operation is completed by the robotic system. The method further includes commanding, using the control system, the transfer robot to retrieve the robotic system from the mobile workstation in response to the automated operation being completed by the robot.

In some forms, the method further includes determining, using the control system, whether the position of the robot within the manufacturing environment corresponds to a predefined position within the manufacturing environment. The method further includes commanding, using the control system, the transfer robot to retrieve the robotic system from the mobile workstation in response to the position of the robot within the manufacturing environment corresponding to the predefined position.

In some forms, the method further includes selecting, by the control system, the transfer robot from among a plurality of transfer robots to transfer the robotic system based on at least one of location data of the plurality of transfer robots and an availability status of the plurality of transfer robots.

The present disclosure also provides a system for guiding a mobile workstation within a manufacturing environment, where the mobile workstation includes a workpiece and one or more on-board position sensors, and where the manufacturing environment includes one or more infrastructure sensors. The system includes a robotic system including a robot that is secured to the mobile workstation with a fastening mechanism, where the robot is configured to perform an automated operation on the workpiece, and where the robotic system includes an on-board vision sensor. The system includes one or more transfer robots configured to transfer the robotic system to or from the mobile workstation. The system includes a control system configured to command the transfer robot to perform a transfer operation of the robotic system, where the transfer operation includes at least one of disposing the robotic system at the mobile workstation or retrieving the robotic system from the mobile workstation. The control system is configured to control the mobile workstation and the robotic system based on image data from the one or more infrastructure sensors, position data from the one or more on-board position sensors, the automated operation to be performed by the robot, or a combination thereof, where the image data corresponds to an undetectable zone of the on-board vision sensor.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1A:
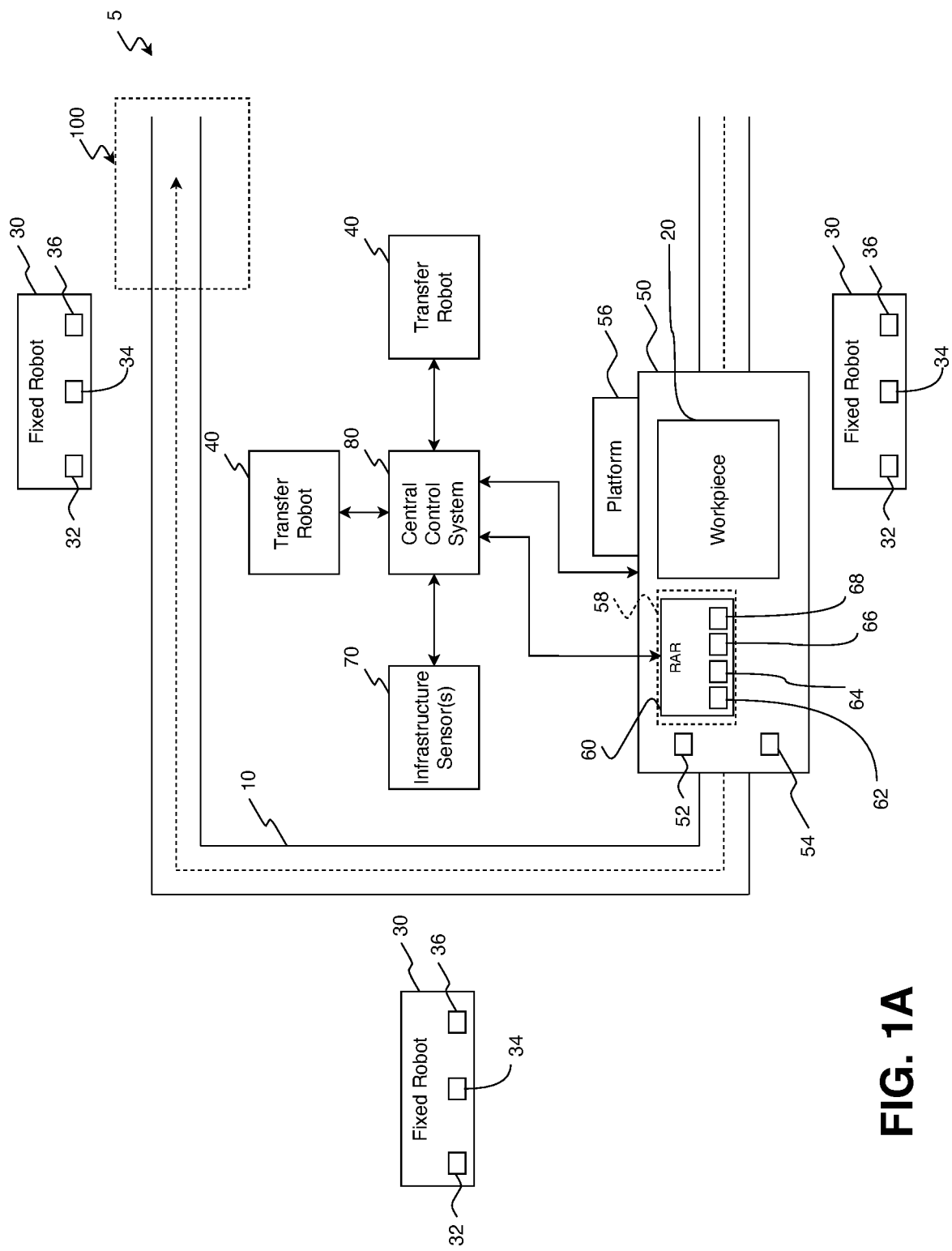
FIG. 1A illustrates a manufacturing environment with a workpiece at a first position in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure is generally directed toward a manufacturing environment that includes a mobile workstation and a portable robotic system disposable on the mobile workstation, where the robotic system is configured to perform various automated operations on a workpiece supported by the mobile workstation. A central control system of the present disclosure is configured to delegate a transfer robot to perform a transfer operation in which the transfer robot transports the robotic system to a selected destination. For example, the transfer robot is controlled to transport the robotic system to the mobile workstation to begin an automated operation or retrieve the robotic system from the mobile workstation. The control system is further configured to guide the mobile workstation and the robotic system through the manufacturing environment utilizing image data from the one or more infrastructure sensors, position data from the one or more on-board position sensors of the mobile workstation, and/or the automated operation to be performed by the robotic system. Selectively providing and retrieving the robotic system from the mobile workpiece having the workpiece that traverses through the manufacturing environment enables low-volume, high cycle time automated operation to be incorporated in a high-volume, low cycle time manufacturing environment.

As used herein, "cycle time" refers to an amount of time needed to complete a given automated operation. As used herein, "automated operation" may refer to one or more motions that a robot performs to achieve a desired result.

Figure 1B:
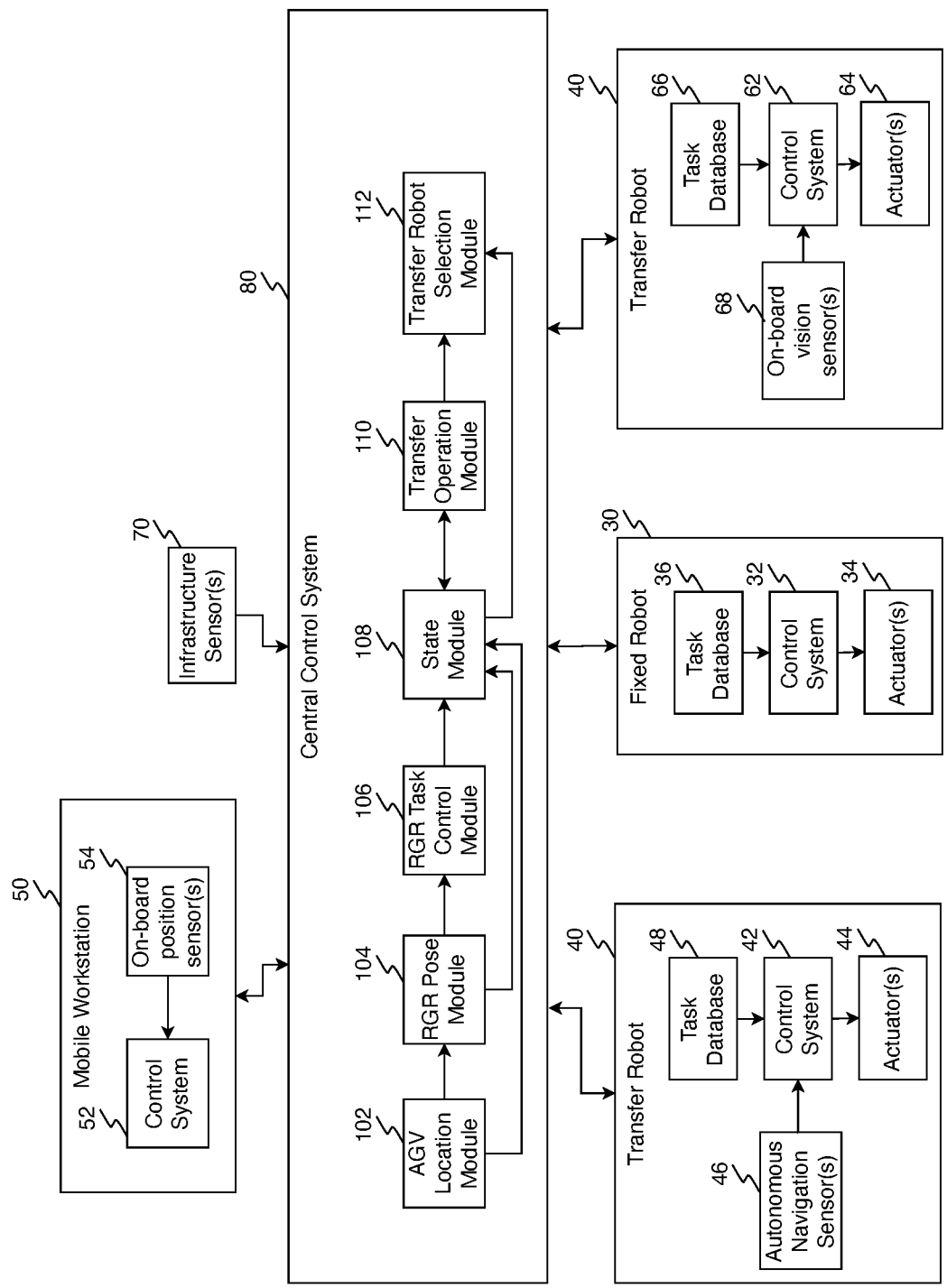
FIG. 1B is a functional block diagram of a central control system, an autonomous guided vehicle, a transfer robot, and a robotic system in accordance with the teachings of the present disclosure.

Referring to FIGS. 1A-1B, a manufacturing environment 5 for manufacturing a component (e.g., a vehicle) is provided. The manufacturing environment 5 generally includes an assembly line 10, a workpiece 20, fixed robots 30, transfer robots 40, a mobile workstation 50, a ride-along robot (RAR) 60, infrastructure sensors 70, and a central control system 80. While the central control system 80 is illustrated as part of the manufacturing environment 5, it should be understood that the central control system 80 may be positioned remotely from the manufacturing environment 5 in other forms. In one form, the fixed robots 30, the transfer robots 40, the mobile workstation 50, the RAR 60, the infrastructure sensors 70, and the central control system 80 are communicably coupled using any suitable wireless communication protocol (e.g., a Bluetooth®-type protocol, a cellular protocol, a wireless fidelity (Wi-Fi)-type protocol, a near-field communication (NFC) protocol, an ultra-wideband (UWB) protocol, among others).

In one form, the fixed robots 30 (e.g., industrial robots) are configured to perform an automated operation on the workpiece 20 as it traverses along the assembly line 10 via the mobile workstation 50. The fixed robots 30 may be confined to a given area in the manufacturing environment 5. As an example, the fixed robots 30 may be provided in an uncaged area having no fence or other containment-like structure for confining the movement of the fixed robot 30. As another example, the fixed robots 30 may be provided in a caged area having a fence or other containment-like structure for confining the movement of the fixed robot 30. Furthermore, the fixed robots 30 may include a control system 32 configured to operate actuators 34 to control the motion of one or more robotic links (e.g., robotic arms) attached thereto and thereby perform one or more automated operations defined in a robot task database 36. In some forms, the automated tasks provided in the robot task database 36 have lower cycle times than the supplemental automated operations of the RAR 60, as described below in further detail. To perform the functionality described herein, the control system 32 may include one or more processor circuits that are configured to execute machine-readable instructions stored in one or more nontransitory computer-readable mediums, such as a random-access memory (RAM) circuit and/or read-only memory (ROM) circuit. The control system 32 may also include other components for performing the operations described herein such as, but not limited to, movement drivers and systems, transceivers, routers, and/or input/output interface hardware.

In one form, the transfer robots 40 are mobile robots that are partially or fully-autonomous and are configured to autonomously move to various locations of the manufacturing environment 5, as instructed by the central control system 80. To autonomously move itself, the transfer robots 40 each include a control system 42 to control various movement systems of the transfer robot 40 (e.g., propulsion systems, steering systems, and/or brake systems) via actuators 44 and based on one or more autonomous navigation sensors 46 (e.g., a global navigation satellite system (GNSS) sensor, an imaging sensor, a local position sensor, among others). Furthermore, the control systems 42 are configured to operate the actuators 44 to control the motion of one or more robotic links (e.g., robotic arms) attached thereto and thereby perform one or more automated operations defined in a robot task database 48 (e.g., disposing the RAR 60 at the mobile workstation 50 to begin an automated operation or retrieving the RAR 60 from the mobile workstation 50 when the automated operation is complete and/or when the mobile workstation 50 is at a predefined location, as described below in further detail).

To perform the functionality described herein, the control systems 42 may include one or more processor circuits that are configured to execute machine-readable instructions stored in one or more nontransitory computer-readable mediums, such as a RAM circuit and/or ROM circuit. The control systems 42 may also include other components for performing the operations described herein such as, but not limited to, movement drivers and systems, transceivers, routers, and/or input/output interface hardware. While the manufacturing environment 5 shown in FIGS. 1A-1B illustrates transfer robots 40, it should be understood that the manufacturing environment 5 can include various other unmanned vehicles in addition or in place of the transfer robots 40 in other forms. As an example, the manufacturing environment 5 can include drones that are similarly configured as the transfer robots 40 such that the drones include a movement system to control autonomous movement throughout the manufacturing environment 5 and perform the transfer operations described herein.

In one form, the mobile workstation 50 is a partially or fully-autonomous vehicle and is configured to autonomously move to various locations of the environment 5, as instructed by the central control system 80. In one example application, the mobile workstation 50 is provided as a platform provided on a conveyer system having multiple platforms that moves the mobile workstation 50 along the assembly line 10. In another example, the mobile workstation 50 is an automated guided vehicle (AGV), such as a portable robot, or other similar device configured autonomously travel within the manufacturing environment 5. To autonomously move itself, the mobile workstation 50 includes a control system 52 to control various movement systems of the mobile workstation 50 (e.g., propulsion systems, steering systems, and/or brake systems) based on one or more on-board position sensors 54 (e.g., a GNSS sensor, a local position sensor, among others) and image data from the infrastructure sensors 70, as described below in further detail. To perform the functionality described herein, the control systems 52 may include one or more processor circuits that are configured to execute machine-readable instructions stored in one or more nontransitory computer-readable mediums, such as a RAM circuit and/or ROM circuit. The control systems 52 may also include other components for performing the operations described herein such as, but not limited to, movement drivers and systems, transceivers, routers, and/or input/output interface hardware.

In one form, the mobile workstation 50 includes one or more elements for supporting and/or securing external components and/or operators thereon. As an example, the mobile workstation 50 includes a platform 56 for supporting an operator that performs an operation on the workpiece 20 as the mobile workstation 50 autonomously navigates throughout the manufacturing environment 5. As another example, the mobile workstation 50 includes a fastening mechanism 58 that secures the workpiece 20 to the mobile workstation 50. The fastening mechanism 58 includes, but is not limited to, a magnetic fastening assembly configured to secure the workpiece 20 onto the mobile workstation 50 using a magnetic force, a vacuum fastening assembly configured to secure the workpiece 20 onto the mobile workstation 50 using a vacuum force, an adhesive fastening assembly configured to secure the workpiece 20 onto the mobile workstation 50 using an adhesive force, or a combination thereof. While the fastening mechanism 58 is shown as part of the mobile workstation 50, it should be understood that the fastening mechanism may be included as part of the workpiece 20 (either partially or wholly) in other forms.

In one form, the RAR 60 is configured to perform a supplemental automated operation on the workpiece 20 in conjunction with an automated operation performed by the fixed robots 30 as it traverses along the assembly line 10 via the mobile workstation 50. In one form, the supplemental automated operation has a higher cycle time than the automated operation performed by the fixed robots 30. Example supplementary automated operations may include, but are not limited to, a 3D printing operation, an inspection operation, a quality control operation, among others. In some forms, the RAR 60 includes a control system 62 configured to operate actuators 64 to control the motion of one or more robotic links (e.g., robotic arms) attached thereto and thereby perform the one or more supplemental automated operations defined in a robot task database 66. To perform the functionality described herein, the control system 62 may include one or more processor circuits that are configured to execute machine-readable instructions stored in one or more nontransitory computer-readable mediums, such as a random-access memory (RAM) circuit and/or read-only memory (ROM) circuit. The control system 62 may also include other components for performing the operations described herein such as, but not limited to, movement drivers and systems, transceivers, routers, and/or input/output interface hardware.

In some forms, one or more on-board vision sensors 68 of the RAR 60 (e.g., a two-dimensional camera, a three-dimensional camera, an infrared sensor, a radar scanner, a laser scanner, a light detection and ranging (LIDAR) sensor, an ultrasonic sensor, among others) are configured to provide imaging data of and surrounding the RAR 60 to the central control system 80. In one form, the image data may indicate a pose (i.e., a position and orientation) of the RAR 60 relative to the mobile workstation 50. In response to receiving the image data, the central control system 80 may fuse the position data obtained from the one or more on-board position sensors 54 of the mobile workstation 50 and the image data obtained from the one or more on-board vision sensors 68 to determine a pose of the RAR 60 within the manufacturing environment 5, as described below in further detail. Accordingly, the control system 62 may be configured to operate the actuators 64 to control the one or more robotic links based on the pose as determined by the central control system 80.

In one form, the infrastructure sensors 70 are imaging sensors that obtain imaging data of the manufacturing environment 5 and detect objects within the manufacturing environment, such as, but not limited to: the workpiece 20, the fixed robots 30, the transfer robots 40, the mobile workstation 50, and the RAR 60 within the manufacturing environment 5. The infrastructure sensors 70 may include a two-dimensional camera, a three-dimensional camera, an infrared sensor, a radar scanner, a laser scanner, a LIDAR sensor, an ultrasonic sensor, among others. In one form, the infrastructure sensors 70 are provided on an infrastructure element within the manufacturing environment 5, such as, but not limited to, a tower, a light pole, a building, a sign, drones, additional robots, among other fixed and/or moveable elements of the manufacturing environment 5. As an example, the infrastructure sensors 70 are selectively positioned on an infrastructure element in the manufacturing environment 5 such that the corresponding image data represents an undetectable zone of the on-board vision sensor 68 of the RAR 60, thereby enhancing sensor coverage of the manufacturing environment 5.

In one form and as shown in FIG. 1B, the central control system 80 includes a mobile workstation location module 102 (denoted as MWS location module in FIG. 1B), a RAR pose module 104, a RAR task control module 106, a state module 108, a transfer operation module 110, and a transfer robot selection module 112. It should be readily understood that any one of the components of the central control system 80 can be provided at the same location or distributed at different locations and communicably coupled accordingly. To perform the functionality as described herein, the central control system 80 includes one or more processor circuits that are configured to execute machine-readable instructions stored in one or more nontransitory computer-readable mediums, such as a RAM circuit and/or ROM circuit. It should be readily understood that the central control system 80 may include other components for performing the operations described herein such as, but not limited to, communication transceivers, routers, input/output communication interfaces, databases, among others.

In one form, the mobile workstation location module 102 is configured to obtain the position data from the on-board position sensors 54 and determine the position of the mobile workstation 50 within the manufacturing environment 5 based on the position data. The mobile workstation location module 102 then provides the position data to the RAR pose module 104.

In one form, the RAR pose module 104 determines a pose of the RAR 60 (i.e., the orientation and the position of the RAR 60 within the manufacturing environment 5) by fusing the position data of the mobile workstation 50 with the image data obtained from the on-board vision sensors 68 and/or the image data obtained from the infrastructure sensors 70. As an example, the RAR pose module 104 employs known digital image recognition techniques to process the image data from the on-board vision sensors 68 and the infrastructure sensors 70, and the RAR pose module 104 fuses the processed image data with the position data from the on-board position sensors 54 to determine the pose of the RAR 60. While the above example describes the RAR pose module 104 determining the pose of the RAR 60, the control system 62 of the RAR 60 may perform the functionality of the RAR pose module 104 and transmit the determined pose to the central control system 80 in another form.

In one form, the RAR task control module 106 is configured to control the RAR 60 based on the corresponding pose or position and/or configured to generate an instruction for the RAR 60 to perform an automated operation based on the corresponding position or pose. More specifically, the RAR task control module 106 provides the pose of the RAR 60 to the control system 62, which then utilizes the pose to control the one or more actuators 64 associated with the respective supplemental automated operation. As an example, the control system 62 controls the one or more actuators 64 to move a respective robotic link to a predefined location on the workpiece 20, and the one or more actuators 64 are moved based on the pose obtained from the RAR task control module 106.

In one form, the state module 108 is configured to generate state data associated with the RAR 60, the transfer robot 40, the fixed robot 30, and/or the mobile workstation 50. As an example, the state module 108 obtains feedback from the control system 62 of the RAR 60 and/or the RAR task control module 106 and determines a status of a given automated operation performed by the RAR 60 (e.g., initiated, a completion percentage, whether the automated operation is completed, among others). As another example, the state module 108 obtains position data as determined by the mobile workstation location module 102, the pose of the RAR 60 as determined by the RAR pose module 104, or a combination thereof, to determine whether the position of the RAR 60 corresponds to a predefined position (e.g., area 100 of the manufacturing environment, as shown in FIG. 1A). As yet another example, the state module 108 obtains feedback from the control system 42 of the transfer robots 40 and/or the transfer operation module 110 and determines whether the transfer robots 40 have received a command to perform or are performing a transform operation, as described below in further detail. As an additional example, the state module 108 is configured to determine whether the workpiece 20 is secured to the mobile workstation 50 based on feedback from the control system 52 indicating whether the fastening mechanism 58 is activated.

In one form, the transfer operation module 110 is configured to command one of the transfer robots 40 within the manufacturing environment to perform a transform operation of the RAR 60 based on the state data. In some forms, the transfer includes disposing the RAR 60 at the mobile workstation 50, retrieving the RAR 60 from the mobile workstation 50, and/or transporting the RAR 60 to a predetermined location within the manufacturing environment 5 once the RAR 60 is retrieved from the mobile workstation 50. As an example, if the state data indicates that the given automated operation to be performed by the RAR 60 is complete, the transfer operation module 110 issues a command to a selected transfer robot 40 to retrieve the RAR 60 from the mobile workstation 50 and transport the RAR 60 to a replenishing station of the manufacturing environment 5 (e.g., a charging station). As another example, if the state data indicates that the RAR 60 is at a predefined location within the manufacturing environment 5, the transfer operation module 110 issues a command to a selected transfer robot 40 to retrieve the RAR 60 from the mobile workstation 50 and transport the RAR 60 to a replenishing station of the manufacturing environment 5 (e.g., a 3D printing material refill station). To retrieve the RAR 60 from the mobile workstation 50, the transfer robot 40 may request the mobile workstation 50 to deactivate the fastening mechanism 58 and remove the RAR 60 from the mobile workstation 50. In another form, if an operator is present, the operator may deactivate the fastening mechanism 58 upon arrival of the transfer robot 40.

In one form, the transfer robot selection module 112 obtains the state data of the transfer robots 40 from the state module 108 and selects a given transfer robot 40 from among the one or more transfer robots 40 based on the state data. As an example, the transfer robot selection module 112 selects the given transfer robot 40 to perform the transfer operation if the state data indicates that the transfer robot 40 is available to perform a transfer (i.e., has not received a command to perform the transfer operation). In addition to the state data, the transfer robot selection module 112 selects a given transfer robot 40 based on other information, such as, but not limited to: type of robots transferable by the transfer robot 40, current location of the transfer robot 40, and/or a RAR deployment schedule of the RARs 60.

While the above example described in FIGS. 1A-1B describe the central control system 80 selecting one of the transfer robots 40 to perform a defined transfer operation, the central control system 80 may select one of the fixed robots 30 to perform the transfer operation in association with the transfer robots 40. Specifically, a set of fixed robots 30 may be designated for transferring the RARs 60 to/from the mobile workstation 50 and may be referred to as fixed transfer robots 30. For example, the transfer robot 40 may transport an RAR 60 to the fixed transfer robot 30, which in return positions the RAR 60 on to the mobile workstation 50. Alternatively, the fixed transfer robot 30 may remove the RAR 60 from the mobile workstation 50 and provide it to the transfer robot 40 for further transport. As such, the central control system 80 may select a given fixed robot 30 based on state data associated with the set of fixed robots 30, where the state data indicates a status of a given automated operation performed by the fixed robot 30, whether the fixed robots 30 have received a command to perform or are performing a transform operation, among others.

In an example application provided by the manufacturing environment 5, the mobile workstation location module 102 determines that the mobile workstation 50 with the workpiece 20 positioned thereon is approaching the assembly line 10. Furthermore, the state module 108 determines that the mobile workstation 50 does not include the RAR 60 disposed thereon. Accordingly, the transfer robot selection module 112 selects one of the transfer robots 40 based on the RAR deployment schedule indicating that one of the RARs 60 needs to be positioned onto the mobile workstation 50 at a given time to perform a supplemental automated operation. The transfer robot 40 may be selected based on the state data indicating that the selected transfer robot 40 is available, the selected transfer robot 40 is configured to transfer and attach the RAR 60 to the mobile workstation 50, and/or the selected transfer robot 40 is closer to the mobile workstation 50 compared to other available transfer robots 40. The transfer operation module 110 issues a command to the selected transfer robot 40 to transport and attach the RAR 60 to the mobile workstation 50 via the fastening mechanism 58. Once the automated operation associated with the RAR 60 is complete or once the mobile workstation 50 reaches the predefined location (e.g., area 100), the transfer robot selection module 112 selects one of the transfer robots 40 based on the state data and issues a command to the selected transfer robot 40 to retrieve the RAR 60 from the mobile workstation 50.

Figure 2:
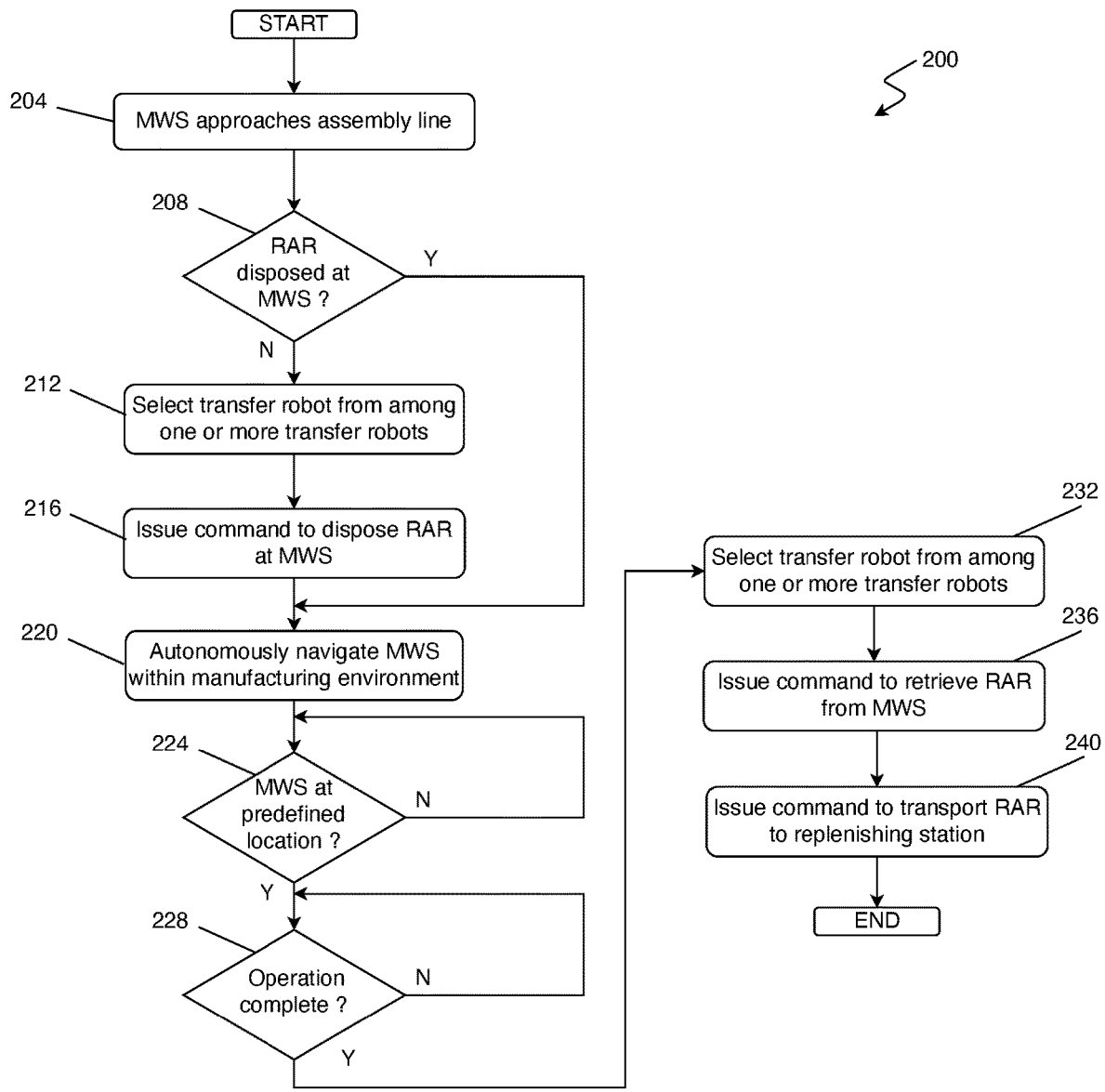
FIG. 2 illustrates an example control routine in accordance with the teachings of the present disclosure.

Referring to FIG. 2, a routine 200 for guiding the mobile workstation 50 within the manufacturing environment 5 and for performing the transfer operation is shown. At 204, the mobile workstation 50 (denoted as MWS in FIG. 2) approaches the assembly line 10. At 208, the central control system 80 determines whether the state data indicates that the RAR 60 is positioned on the mobile workstation 50. If so, the routine 200 proceeds to 220. Otherwise, if the central control system 80 determines that the state data indicates that the RAR 60 is not positioned on the mobile workstation 50, the routine 200 proceeds to 212, where the central control system 80 selects a transfer robot 40 from among the one or more transfer robots 40 based on the associated state data. At 216, the central control system 80 issues a command to the selected transfer robot 40 to position the respective RAR 60 on the mobile workstation 50. The routine 200 then proceeds to 220, where the mobile workstation 50 autonomously navigates within the manufacturing environment 5 along the assembly line 10.

At 224, the central control system 80 determines whether the mobile workstation 50 is at a predefined location. If so, the routine 200 proceeds to 228. Otherwise, if the central control system 80 determines that the mobile workstation 50 is not at the predefined location, the routine 200 remains at 224 until the mobile workstation 50 is at the predefined location. At 228, the central control system 80 determines whether the automated operation performed by the RAR 60 is completed. If so, the routine 200 proceeds to 232. Otherwise, if the central control system 80 determines that the automated operation is not complete, the routine 200 remains at 228 until the automated operation is complete. At 232, the central control system 80 selects a transfer robot 40 from among the one or more transfer robots 40 based on the associated state data. At 236, the central control system 80 issues a command to the selected transfer robot 40 to retrieve the respective RAR 60 from the mobile workstation 50. At 240, the central control system 80 issues a command to transport the RAR 60 to a replenishing station of the manufacturing environment 5 (e.g., a 3D printing material refill station), and the routine 200 then ends.

It should be readily understood that the routine 200 is just an example routine and other control routines may be implemented. For example, the central control system 80 may first determine whether the automated operation performed by the RAR 60 is complete before determining if the MSW is at a predefined location. Thus, the RAR 60 can be removed at a selected location from among multiple predefined locations after completing the operation.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice; material, manufacturing, and assembly tolerances; and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

In the figures, the direction of an arrow, as indicated by the arrowhead, generally demonstrates the flow of information (such as data or instructions) that is of interest to the illustration. For example, when element A and element B exchange a variety of information, but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, the term "module" and/or "controller" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

What is claimed is:

1. A system for guiding a mobile workstation within a manufacturing environment, wherein the mobile workstation includes a workpiece and one or more on-board position sensors, and wherein the manufacturing environment includes one or more infrastructure sensors, the system comprising:
   a robotic system including a robot disposable at the mobile workstation, wherein the robot is configured to perform an automated operation on the workpiece;
   one or more transfer robots configured to transport the robotic system to or from the mobile workstation; and
   a control system configured to:
      command the one or more transfer robots to perform a transfer operation of the robotic system, wherein the transfer operation includes at least one of disposing the robotic system at the mobile workstation or retrieving the robotic system from the mobile workstation, and
      control the mobile workstation and the robotic system based on image data from the one or more infrastructure sensors, position data from the one or more on-board position sensors, the automated operation to be performed by the robot, or a combination thereof.

2. The system of claim 1, wherein the image data corresponds to an undetectable zone of an on-board vision sensor of the robotic system.

3. The system of claim 1, wherein the mobile workstation includes a platform for supporting an operator of the robotic system.

4. The system of claim 1, wherein the robotic system includes one or more actuators to adjust a position of the robot within the mobile workstation.

5. The system of claim 4, wherein the position data corresponds to an on-board position of the robot on the mobile workstation, and wherein the one or more actuators adjust the position of the robot within the mobile workstation based on the on-board position.

6. The system of claim 1, wherein the robotic system further comprises a fastening mechanism to secure the robot to the mobile workstation.

7. The system of claim 6, wherein the fastening mechanism is operable to attach the robot to and detach the robot from the mobile workstation using a magnetic force, a vacuum force, an adhesive force, or a combination thereof.

8. The system of claim 1, wherein the control system is configured to:
   determine whether the automated operation is completed by the robotic system; and
   command the one or more transfer robots to retrieve the robotic system from the mobile workstation in response to the automated operation being completed by the robot system.

9. The system of claim 1, wherein the control system is configured to:
   determine whether the position of the robot within the manufacturing environment corresponds to a predefined position within the manufacturing environment; and
   command the one or more transfer robots to retrieve the robotic system from the mobile workstation in response to the position of the robot within the manufacturing environment corresponding to the predefined position.

10. The system of claim 1, wherein the one or more transfer robots comprises a plurality of transfer robots, wherein the control system is configured to select a transfer robot from the plurality of the transfer robots to transfer the robotic system.

11. A method for guiding a mobile workstation within a manufacturing environment, wherein the mobile workstation includes a workpiece and one or more on-board position sensors, and wherein the manufacturing environment includes one or more infrastructure sensors, the method comprising:
   moving, using the mobile workstation, the workpiece through the manufacturing environment;
   performing, using a robotic system including a robot disposed in the mobile workstation, an automated operation on the workpiece;
   commanding, using a control system, a transfer robot to transfer the robotic system to or from the mobile workstation; and controlling, using the control system, the mobile workstation and the robotic system based on image data from the one or more infrastructure sensors, position data from the one or more on-board position sensors, the automated operation to be performed by the robot, or a combination thereof.

12. The method of claim 11, wherein the image data corresponds to an undetectable zone of an on-board vision sensor of the robotic system.

13. The method of claim 11 further comprising providing a platform on the mobile workstation for an operator.

14. The method of claim 11, wherein the position data corresponds to an on-board position of the robot on the mobile workstation, and the method further comprises adjusting the position of the robot based on the on-board position.

15. The method of claim 11 further comprising securing the robot to the mobile workstation via a fastening mechanism of the robotic system prior to performing the automated operation.

16. The method of claim 15, wherein the fastening mechanism employs a magnetic force, a vacuum force, an adhesive force, or a combination thereof.

17. The method of claim 11 further comprising:
determining, using the control system, whether the automated operation is completed by the robotic system; and
commanding, using the control system, the transfer robot to retrieve the robotic system from the mobile workstation in response to the automated operation being completed by the robot.

18. The method of claim 11 further comprising:
determining, using the control system, whether the position of the robot within the manufacturing environment corresponds to a predefined position within the manufacturing environment; and
commanding, using the control system, the transfer robot to retrieve the robotic system from the mobile workstation in response to the position of the robot within the manufacturing environment corresponding to the predefined position.

19. The method of claim 11 further comprising selecting, by the control system, the transfer robot from among a plurality of transfer robots to transfer the robotic system based on at least one of location data of the plurality of transfer robots and an availability status of the plurality of transfer robots.

20. A system for guiding a mobile workstation within a manufacturing environment, wherein the mobile workstation includes a workpiece and one or more on-board position sensors, and wherein the manufacturing environment includes one or more infrastructure sensors, the system comprising:
a robotic system including a robot that is secured to the mobile workstation with a fastening mechanism, wherein the robot is configured to perform an automated operation on the workpiece, and wherein the robotic system includes an on-board vision sensor;
one or more transfer robots configured to transfer the robotic system to or from the mobile workstation; and
a control system configured to:
command the one or more transfer robots to perform a transfer operation of the robotic system, wherein the transfer operation includes at least one of disposing the robotic system at the mobile workstation or retrieving the robotic system from the mobile workstation, and
control the mobile workstation and the robotic system based on image data from the one or more infrastructure sensors, position data from the one or more on-board position sensors, the automated operation to be performed by the robot, or a combination thereof, wherein the image data corresponds to an undetectable zone of the on-board vision sensor.

* * * * *